(12) United States Patent
Soejima et al.

(10) Patent No.: US 6,748,489 B2
(45) Date of Patent: Jun. 8, 2004

(54) VOLUME MANAGEMENT METHOD AND APPARATUS

(75) Inventors: Ken'ichi Soejima, Yokohama (JP); Masayasu Asano, Yokohama (JP); Satoshi Miyazaki, Yamato (JP)

(73) Assignee: Hitachi, Ltd., Tokyo (JP)

( * ) Notice: Subject to any disclaimer, the term of this patent is extended or adjusted under 35 U.S.C. 154(b) by 231 days.

(21) Appl. No.: 10/041,578

(22) Filed: Jan. 10, 2002

(65) Prior Publication Data

US 2003/0074528 A1 Apr. 17, 2003

(30) Foreign Application Priority Data

Oct. 15, 2001 (JP) ........................................ 2001-316860

(51) Int. Cl.[7] .............................................. G06F 12/00
(52) U.S. Cl. .............................. 711/114; 711/112; 714/6
(58) Field of Search ........................ 711/111–112, 114, 711/4; 714/6–8

(56) References Cited

U.S. PATENT DOCUMENTS 6,256,705 B1 * 7/2001 Li et al. ...................... 711/112
6,405,284 B1 * 6/2002 Bridge ........................ 711/114

* cited by examiner

Primary Examiner—Nasser Moazzami
(74) Attorney, Agent, or Firm—Mattingly, Stanger & Malur, P.C.

(57) ABSTRACT

A volume management method is proposed for setting at least a logical volume over a plurality of physical storage devices by taking requested performance of other volumes into consideration. The volume management method comprises the steps of: receiving a volume creation request specifying a requested storage capacity and requested average performance; forming a judgment as to whether or not there exists an unoccupied area satisfying the requested storage capacity throughout the storage devices; forming a judgment as to whether or not all volumes, which include existing volumes each sharing any of the storage devices with a volume to be created and the volume to be created, each satisfy its requested average performance by referring to information of requested average performance on a storage means for each of the existing volumes if the unoccupied area satisfying a requested storage capacity is determined to exist; and setting the volume to be created if all the volumes each satisfy the requested average performance.

10 Claims, 11 Drawing Sheets

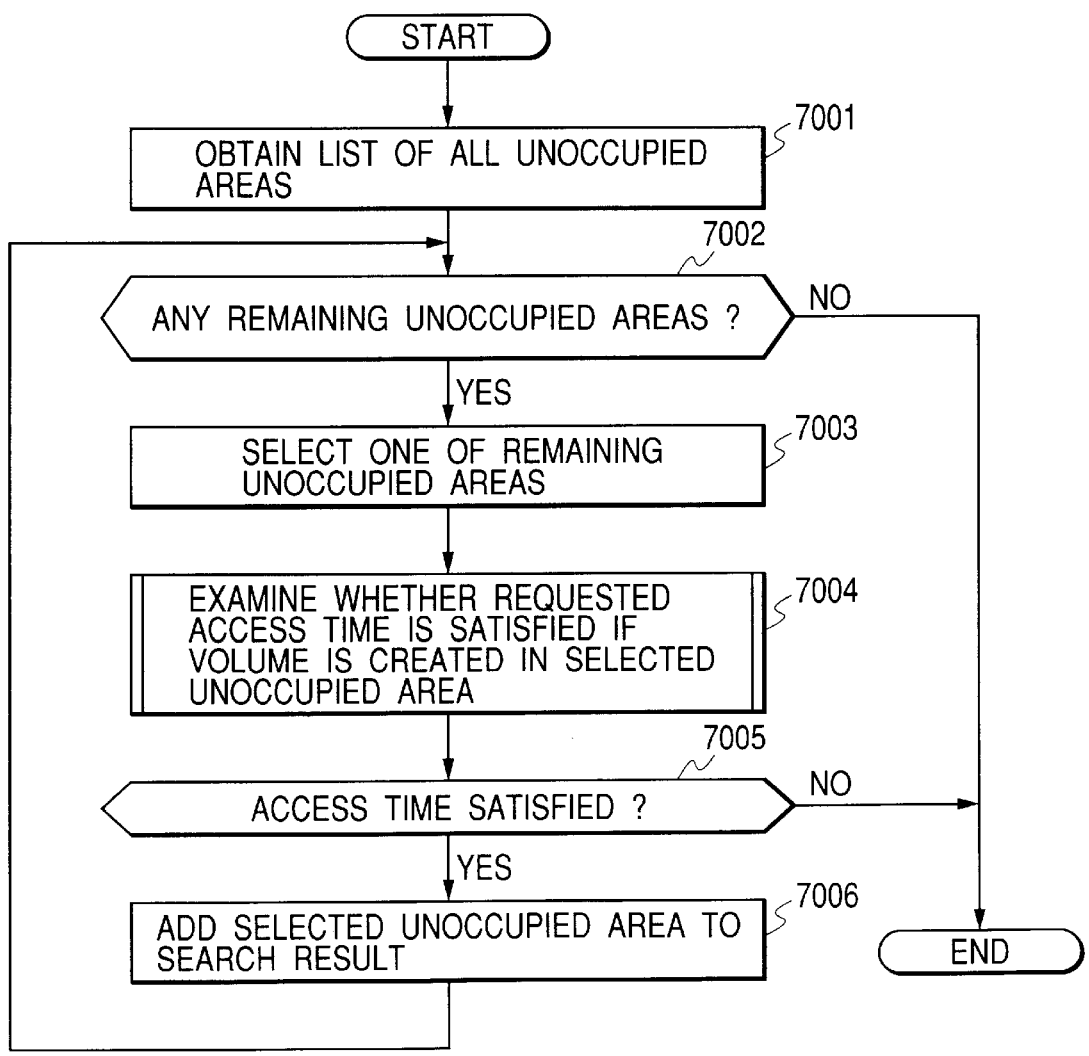

FIG. 8

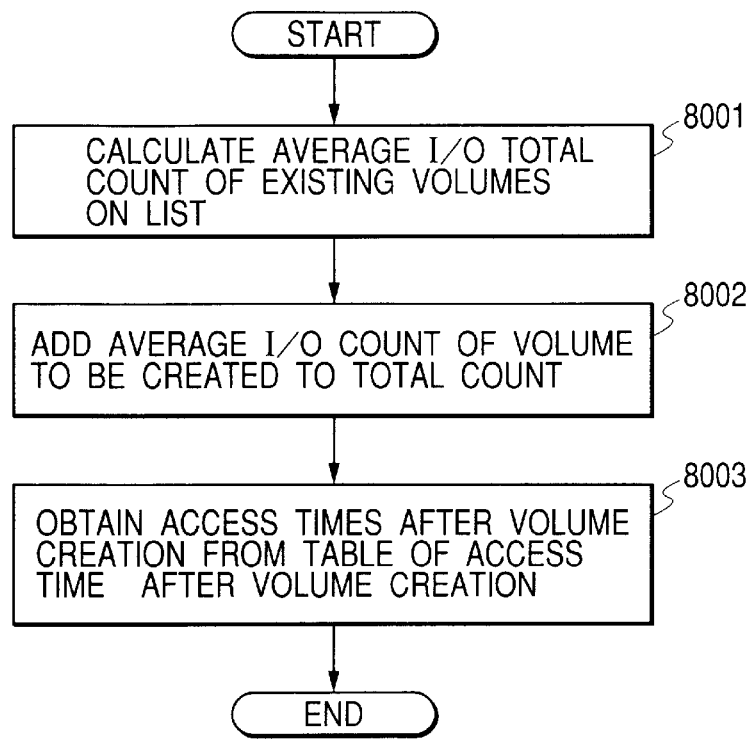

START
↓
CALCULATE AVERAGE I/O TOTAL COUNT OF EXISTING VOLUMES ON LIST — 8001
↓
ADD AVERAGE I/O COUNT OF VOLUME TO BE CREATED TO TOTAL COUNT — 8002
↓
OBTAIN ACCESS TIMES AFTER VOLUME CREATION FROM TABLE OF ACCESS TIME AFTER VOLUME CREATION — 8003
↓
END

FIG. 9

| AVERAGE I/O TOTAL IN SAME PARITY GROUP (DEMANDS/SECOND) | ACCESS TIME AFTER VOLUME CREATION |
|---|---|
| 0 – 199 | 20msec |
| 200 – 499 | 24msec |
| 500 – 799 | 30msec |
| 800 – 999 | 40msec |
| GREATER THAN 1,000 | AVERAGE I/O TOTAL COUNT/10msec |

| VOLUME | REQUESTED ACCESS TIME | AVERAGE I/O COUNT (DEMANDS/SECOND) |
|---|---|---|
| VOLUME 1 | 30msec | 100 |
| VOLUME 2 | 40msec | 200 |
| VOLUME 3 | 55msec | 150 |
| VOLUME 4 | 45msec | 200 |
| VOLUME 5 | 35msec | 300 |

| PARITY GROUP | PHYSICAL DISK | RAID LEVEL |
|---|---|---|
| PARITY GROUP 1 | PHYSICAL DISKS 1 AND 2 | RAID -5 |
| PARITY GROUP 2 | PHYSICAL DISKS 3 TO 6 | RAID -1 |
| PARITY GROUP 3 | PHYSICAL DISKS 7 TO 11 | RAID -5 |
| PARITY GROUP 4 | PHYSICAL DISKS 12 TO 15 | RAID -5 |

FIG. 11(b)

| PARITY GROUP | ASSIGNED ENTITY | CAPACITY (Mbyte) |
|---|---|---|
| PARITY GROUP 1 | VOLUME 1 | 3000 |
| | UNOCCUPIED AREA | 5000 |
| PARITY GROUP 2 | VOLUME 2 | 5000 |
| | VOLUME 3 | 8000 |
| | VOLUME 4 | 2000 |
| | UNOCCUPIED AREA | 5000 |
| PARITY GROUP 3 | UNOCCUPIED AREA | 10000 |
| PARITY GROUP 4 | VOLUME 5 | 5000 |
| | UNOCCUPIED AREA | 5000 |

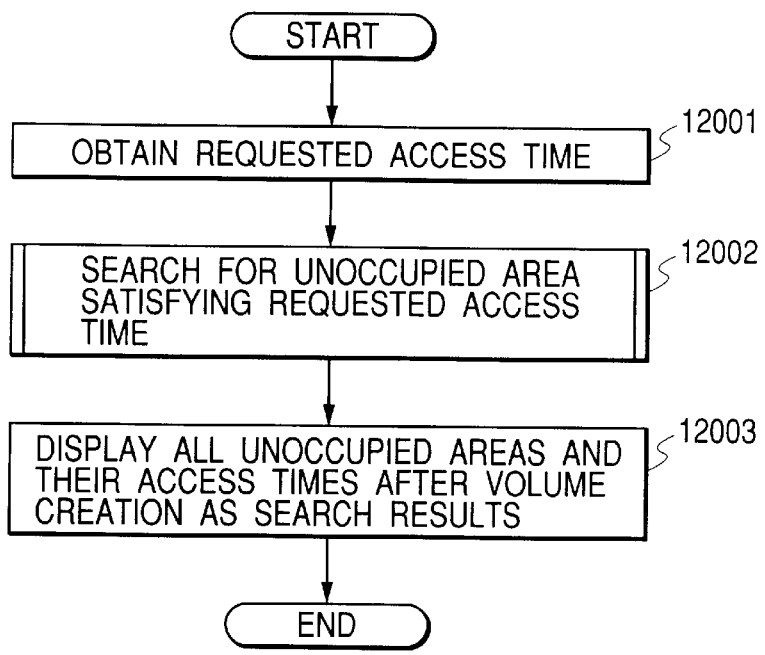
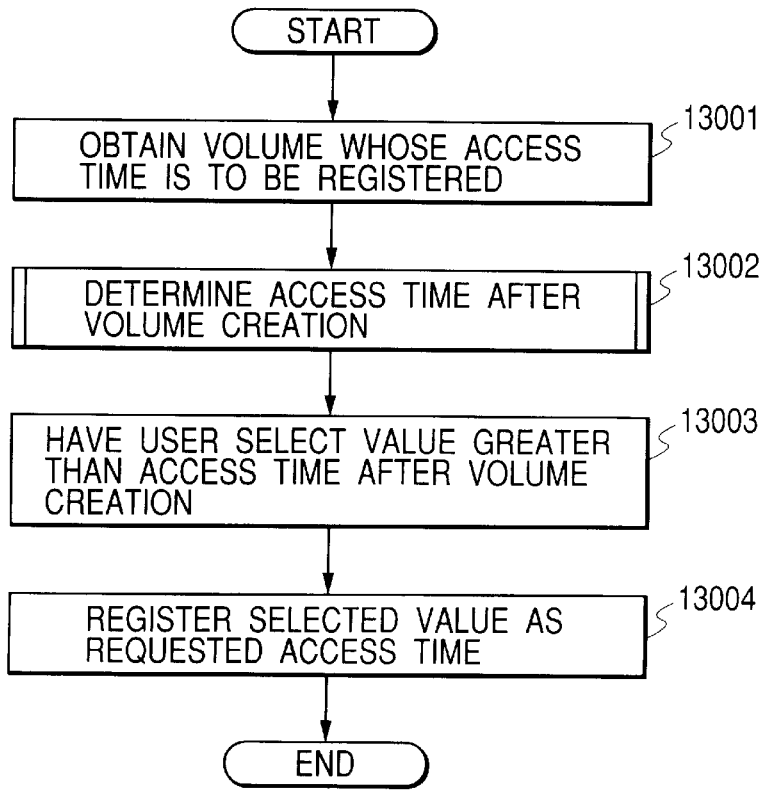

VOLUME MANAGEMENT METHOD AND APPARATUS

BACKGROUND OF THE INVENTION

In general, the present invention relates to a volume management method for defining a volume on a physical storage device of a storage apparatus. More particularly, the present invention relates to a processing technique for creating and moving a volume by consideration of effects on performance of other volumes.

There exists a technology called RAID (Redundant Array of Inexpensive Disks) for improving reliability and performance by grouping two or more physical disks to provide redundancy. In using a storage apparatus by adoption of the RAID technology, first of all, two or more physical disks (physical storage devices) of a storage apparatus are collected to form a group called a parity group. Then, logical storage areas are defined in the parity group. The logical storage areas are each called a volume to be used by a computer making accesses to the storage apparatus. In many cases, at least two volumes can be defined in a parity group. FIG. 1(a) shows typical definition. As shown in FIG. 1(a), four physical disks 1001, 1002, 1003 and 1004 constitute a parity group 1005 in which three volumes 1006, 1007 and 1008 are defined. The volumes 1006, 1007 and 1008 defined in the parity group 1005 all use the physical disks 1001, 1002, 1003 and 1004. A state of letting different volumes share the same physical disk prevails not only in a case wherein a storage apparatus adopting the RAID technology is used, but also a case in which two or more volumes are defined on a physical disk.

There are several ways to define the method of composing a parity group of a plurality of physical disks by using such a RAID technology. A standard used in the definition of the method is referred to as a RAID level. At RAID level 0, which is also called a stripe, for example, data is written sequentially into a plurality of physical disks in predetermined-size units. At RAID level 1, which is called a mirror, on the other hand, data is read out from and written into 2 physical disks. At RAID levels 4 and 5 for storing data redundantly, data is stored by being distributed among a plurality of disks except one specific disk so that data can be recovered onto the specific disk in case another physical disk fails and becomes unusable. RAID levels 4 and 5 differ from each other in that they employ different ways of holding redundant data.

There also exists a storage apparatus in which a parity group is composed by grouping partial areas of physical disks instead of whole areas of physical disks. In this case, a physical disk may belong to a plurality of parity groups. An example is shown in FIG. 1(b). In this example, a parity group 1015 is composed of partial areas of physical disks 1009, 1010, 1011 and 1012. A volume 1016 is defined in the parity group 1015. A parity group 1013 is composed of partial areas of physical disks 1009 and 1010 and no volume is defined in the parity group 1013. A parity group 1014 is composed of partial areas of physical disks 1011 and 1012 and a volume 1017 is defined in the parity group 1014. In this storage apparatus, the physical disks 1009, 1010, 1011 and 1012 each belong to 2 parity groups.

In some storage apparatuses adopting the RAID technology, a volume is not directly defined in a parity group. Instead, such storage apparatuses have a function whereby logical disks are defined in a parity group, logical disks are divided and joined repeatedly across several hierarchical layers and a logical disk at the top hierarchical layer is defined as a volume. In the storage apparatus shown in FIG. 1(b), for example, a logical disk is defined in each of parity groups 1013 and 1014, and what is obtained by joining the defined logical disks forms a volume.

One of references describing the RAID technology is a document authored by Mark Farley with a title of "Building Storage Networks," Network Professional's Library, Osborne.

By the way, in recent years, attention is paid to a SAN (Storage Area Network), which is a high-speed network comprising typically fiber channels connecting a plurality of storage apparatuses to a plurality of client computers using the storage apparatuses. In the SAN environment, a client computer is capable of using two or more storage apparatuses at the same time and a storage apparatus can be used by two or more client computers. A typical configuration of the SAN is shown in FIG. 2. In the SAN configuration shown in FIG. 2, a network 2001 connects storage apparatuses 2005, 2006 and 2007, client computers 2002 and 2003 using the storage apparatuses 2005, 2006 and 2007 as well as a management computer 2004 for managing the storage apparatuses 2005, 2006 and 2007 to each other. The management computer 2004 defines internal configurations of the storage apparatuses 2005, 2006 and 2007, which are connected to the network 2001, and controls permissions of accesses to the storage apparatuses 2005, 2006 and 2007. In the SAN environment shown in FIG. 2, if the client computer 2002 is given an access permission by the management computer 2004, the client computer 2002 is capable of making accesses to all the storage apparatuses 2005, 2006 and 2007. In addition, the client computer 2002 and the client computer 2003 are capable of sharing the storage apparatus 2005.

Many storage apparatuses such as the storage apparatuses 2005, 2006 and 2007, which are used in the SAN environment like the one shown in FIG. 2, adopt the RAID technology described earlier. For example, a plurality of volumes using the same physical disks are created in the storage apparatus 2005, and each of the volumes can be used by the client computers 2002 and 2003.

One of references describing the SAN is a document with a title of "Data Storage: Report 2000," an edition of Nikkei Computopia, 2000.

A storage management program is used for doing work to create and move a parity group and a volume. The storage management program is executed by the management computer connected to the SAN or a SAN terminal provided with a storage apparatus. If physical disks in a storage apparatus being processed have sufficiently large storage capacities and the storage apparatus' necessary resources can all be used, requested operations can always be carried out.

By the way, the storage management program may have a function relevant to management of performance of physical disks and volumes. The storage management program may be provided with a function to monitor an average access time of a volume in physical disks and issues a warning if the monitored access time exceeds the average access time's upper limit determined in advance. The storage management program may have a function to store a performance log and optimize performance by relocation of volumes in accordance with the stored performance log.

SUMMARY OF THE INVENTION

In a case wherein two or more volumes use the same physical disk shown in FIGS. 1(a) and 1(b), if accesses are concentrated on a specific one of the volumes, it is quite within the bounds of possibility that the performance of another volume using the same physical disk deteriorates. Assume that accesses are concentrated on the volume 1006 shown in FIG. 1(*a*). In this case, the performance of the volumes 1007 and 1008, which use the same physical disk, deteriorates. From a different point of view, if an already existing volume displays requested performance and a new volume is created to use the same physical disk as the already existing volume or a volume is moved from another physical disk to the same physical disk, it is quite within the bounds of possibility that the already existing volume is no longer capable of satisfying the requested performance. Assume that the volume 1006 shown in FIG. 1(*a*) currently has an average access time of 18 msec, satisfying a required average access time of 20 msec. Let a new volume be created in the parity group 1005. In this case, the average access time of the volume 1006 deteriorates to 23 msec. Thus, the volume 1006 no longer satisfies the requested average access time of 20 msec.

In an environment wherein a physical disk can be used from a plurality of client computers as is the case with the SAN environment shown in FIG. 2, special attention needs to be paid to the problems described above. This is because volumes used by different client computers can be defined on the same physical disk. In such a case, if a volume is newly created to be used by a certain client computer, the performance of a volume used by another client computer deteriorates. In addition, most of storage apparatuses used in the SAN environment adopt the RAID technology wherein relations between physical disks and volumes are set repeatedly across several hierarchical layers, resulting in a complexity. Thus, the person in charge of storage-apparatus management must manually verify which volumes share the same physical disk when changing a volume configuration. Such manual work is impractical.

In spite of the fact that the contemporary storage apparatus has the problems described above, the conventional management program and the conventional storage apparatus do not have a function for creating and moving a volume by consideration of effects on the performance of another volume.

In addition, a management program having the conventional function related to performance adopts a technique for detecting deterioration of performance and improving the deteriorating performance after actually using a volume instead of considering effects on the performance of another volume in creating or moving a volume. Thus, it is quite within the bounds of possibility that a volume becomes incapable of meeting requested average performance temporarily and the performance of another volume deteriorates even after volume relocation for preventing the performance from deteriorating.

It is thus an object of the present invention to provide a management technique for creating and moving a volume by consideration of requested performance of all related other volumes.

In accordance with an aspect of the present invention, there is provided a volume management method for setting at least a logical volume over a plurality of physical storage devices, said volume management method comprising the steps of:

receiving a volume creation request specifying information on a requested storage capacity and information on requested average performance;

forming a judgment as to whether or not there exists an unoccupied area satisfying the requested storage capacity throughout the storage devices;

forming a judgment as to whether or not all volumes, which include existing volumes each sharing any of the storage devices with a volume to be created and the volume to be created, each satisfy its requested average performance by referring to information of requested average performance on a storage means for each of said existing volumes if said unoccupied area satisfying a requested storage capacity is determined to exist; and setting said volume to be created if all said volumes each satisfy said requested average performance.

In accordance with another aspect of the present invention, there is provided a volume management method for searching a storage apparatus comprising a plurality of physical storage devices, on which at least one logical volume is set, for an unoccupied area used by a new volume over some of said physical storage devices, said volume management method comprising the steps of:

receiving an unoccupied-area-searching request specifying information on requested average performance;

forming a judgment as to whether or not all volumes, which include existing volumes and the new volume supposed to be added to the existing volumes, each satisfy its requested average performance by referring to information of requested average performance on a storage means for each of the existing volumes which share any of the storage device with an unoccupied area; and displaying information on the area if all the volumes each satisfy the requested average performance.

BRIEF DESCRIPTION OF THE DRAWINGS

FIG. 7 shows a flowchart representing a procedure for searching for an unoccupied area satisfying a requested access time in accordance with the embodiment;

FIG. 8 shows a flowchart representing a procedure for determining an access time after creation of a volume in the embodiment;

FIG. 9 shows a typical table for determining an access time after creation of a volume;

FIG. 10 shows a table of data held by a requested-access-time-holding means implemented by the embodiment;

FIGS. 11(*a*) and 11(*b*) show tables of information held by a storage-configuration-information-holding unit implemented by the embodiment;

FIG. 12 shows a flowchart representing a procedure for acquiring a list of volumes satisfying a requested access time in accordance with another embodiment; and FIG. 13 shows a flowchart representing a procedure for cataloging a requested access time in accordance with the embodiment.

DETAILED DESCRIPTION OF THE PREFERRED EMBODIMENTS

A first embodiment implements a procedure whereby, when a volume is created, an average access time of each other volume is verified not to exceed its requested average access time and, if it is quite within the bounds of possibility that the former exceeds the latter, a warning or an alternative plan is displayed. The average access time and the requested average access time are referred to hereafter simply as an access time and a requested access time respectively. It should be noted that a small access time indicates that data can be accessed in a short period of time and, hence, indicates high performance. In the following description, an (average) access time satisfying a requested (average) access time means an average access time shorter than a requested (average) access time.

Figure 1A:
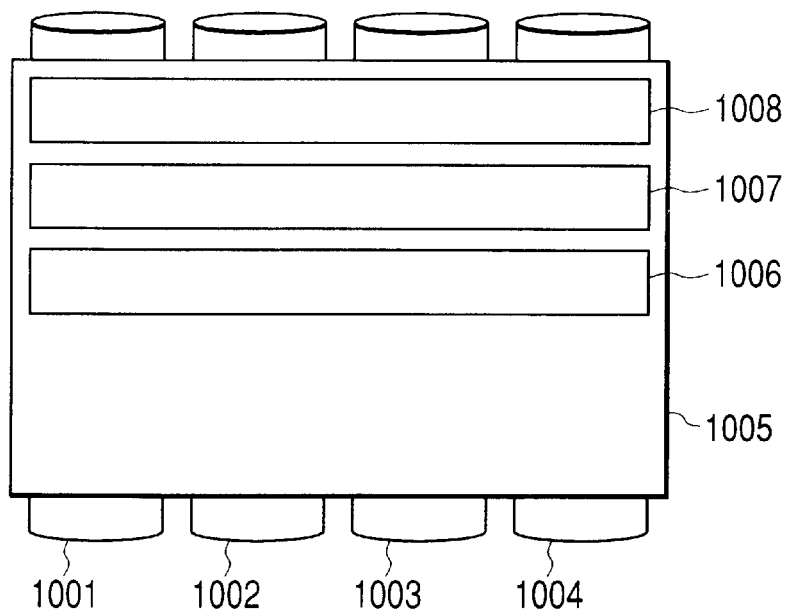
FIGS. 1(*a*) and 1(*b*) are explanatory diagrams showing relations between physical discs and volumes.
Figure 1B:
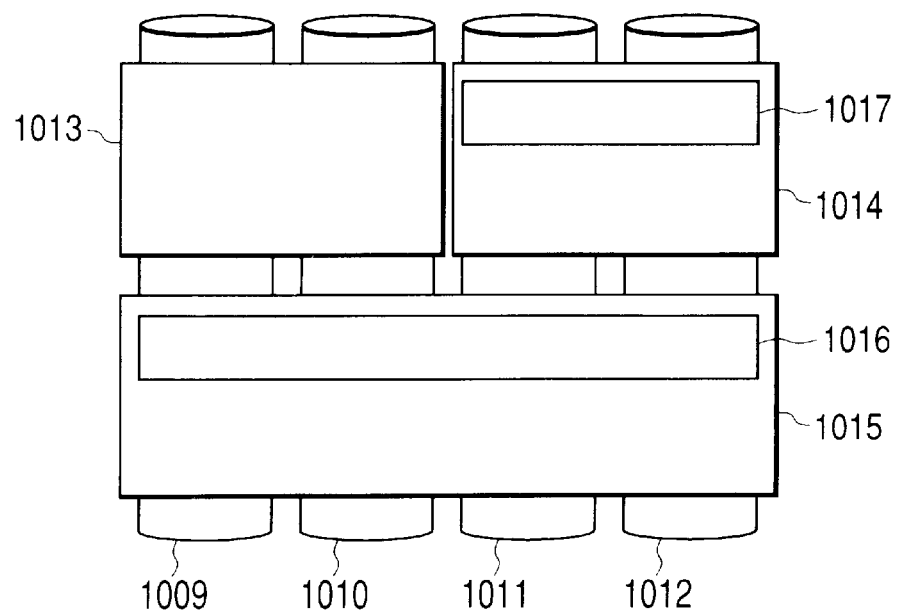
Figure 2:
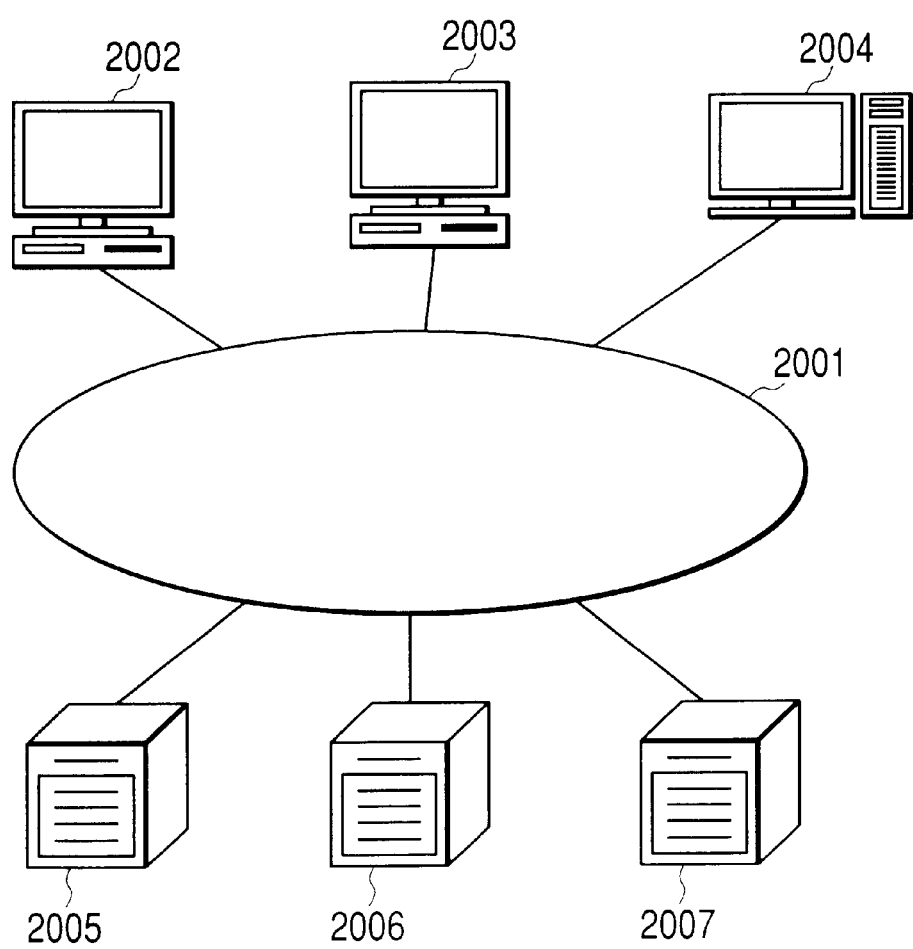
FIG. 2 is a diagram showing the configuration of a computer system provided by an embodiment of the present invention.
Figure 3:
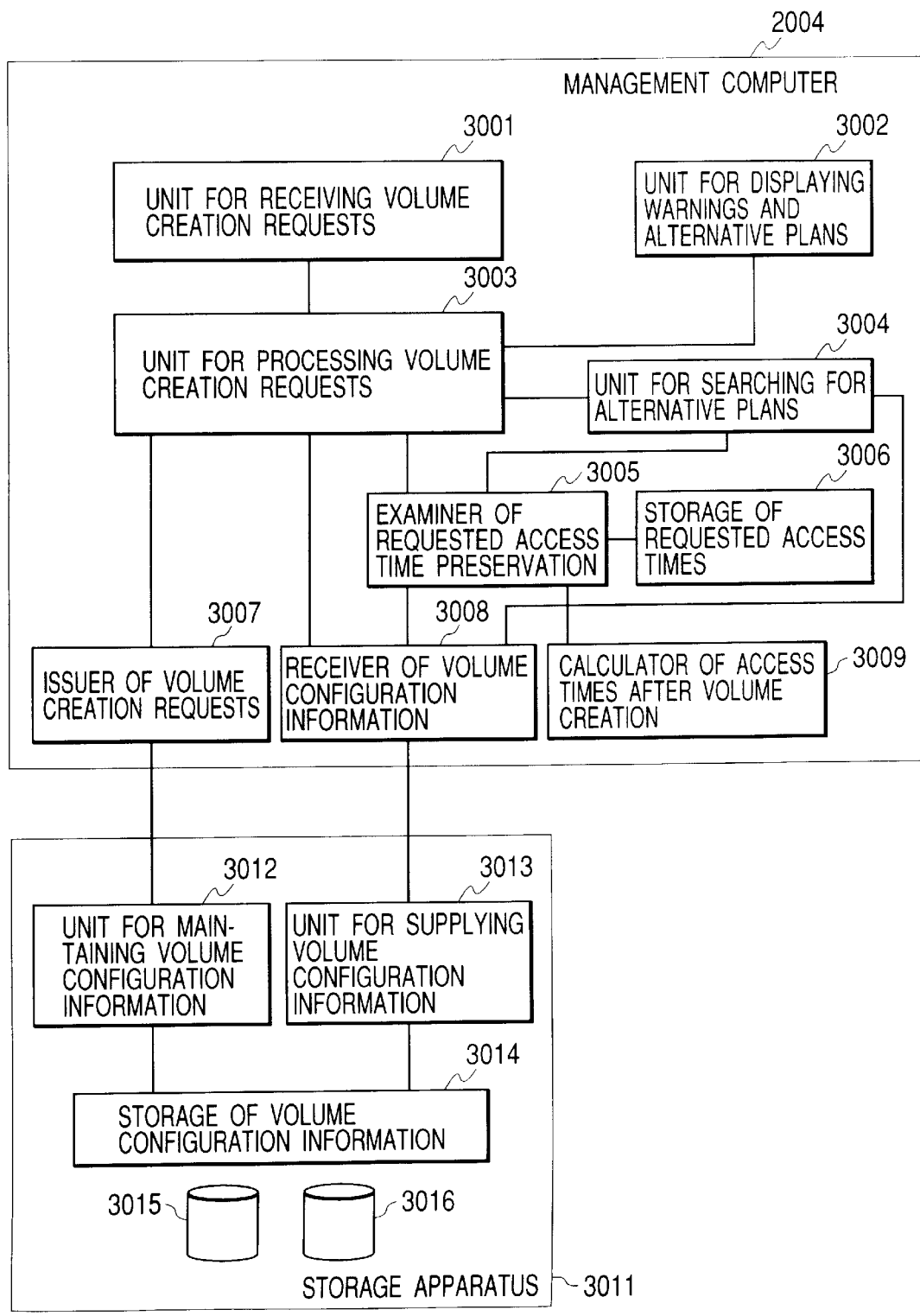
FIG. 3 is a block diagram showing the configuration of a management computer provided by the embodiment.

FIG. 3 is a block diagram showing the configuration of a management computer 2004 shown in FIG. 2. A storage apparatus 3011 shown in FIG. 3 corresponds to the storage apparatus 2005, 2006 or 2007 shown in FIG. 2. The storage apparatus 3011 includes physical disks 3015 and 3016. A volume-creation-request-receiving unit 3001 receives a volume creation request issued by the person in charge of system management, the storage capacity of a volume to be created, information on a parity group in which the volume is to be created, the average number of input/output requests issued to the volume to be created and a requested access time. The average number of input/output requests issued to the volume to be created is referred to hereafter as an average I/O count. A volume-creation-request-processing unit 3003 accepts a request received by the volume-creation-request-receiving unit 3001 and carries out processing in conjunction with a requested-access-time preservation examiner 3005, a volume-configuration-information receiver 3008, an alternative-plan-searching unit 3004, a volume-creation-request issuer 3007 and a warning & alternative-plan-displaying unit 3002.

The volume-configuration-information receiver 3008 issues a request to acquire information on the configuration of volumes defined on the physical disks 3015 and 3016 to a volume-configuration-information-supplying unit 3013 in the storage apparatus 3011 and acquires a result of the request. The volume-creation-request issuer 3007 issues a request for creation of a volume to a volume-configuration-information-maintaining unit 3012 in the storage apparatus 3011 to change information on the configuration of volumes defined on the physical disks 3015 and 3016 in the storage apparatus 3011. The volume-configuration-information-supplying unit 3013 in the storage apparatus 3011 reads out information on the configuration of volumes from a volume-configuration-information storage unit 3014, and supplies the information to the volume-configuration-information receiver 3008. The volume-configuration-information-maintaining unit 3012 changes volume-configuration information stored in the volume-configuration-information storage unit 3014 in accordance with a volume-creation request received from the volume-creation-request issuer 3007. The volume-configuration-information storage unit 3014 holds information on the configuration of volumes defined on the physical disks 3015 and 3016 in the storage apparatus 3011, and supplies as well as changes the information on the configuration of volumes in accordance with requests issued by the volume-configuration-information-supplying unit 3013 and the volume-configuration-information-maintaining unit 3012 respectively. When a specified volume is created in accordance with a request from the volume-creation-request-processing unit 3003, in conjunction with the volume-configuration-information receiver 3008, a requested-access-time storage 3006, a post-volume-creation-access-time calculator 3009 and the alternative-plan-searching unit 3004, the requested-access-time preservation examiner 3005 verifies whether or not the access time of each volume other than the specified volume satisfies a requested access time. The requested-access-time storage 3006 holds a requested access time as information on performance for each volume and supplies the requested access time of a specified volume in accordance with a request issued by the requested-access-time preservation examiner 3005. The post-volume-creation-access-time calculator 3009 determines an access time that can be satisfied by each volume when a volume is created at a specified position in accordance with a request issued by the requested-access-time preservation examiner 3005. The alternative-plan-searching unit 3004 searches for an unoccupied area that has a specified size and satisfies a specified access time in accordance with a request issued by the requested-access-time preservation examiner 3005. The warning & alternative-plan-displaying unit 3002 displays a notice informing the user that a volume other than the requested volume does not satisfy the requested access time of the other volume in case a volume creation operation requested by the user is carried out in accordance with a request issued by the volume-creation-request-processing unit 3003, and the unit 3002 displays an alternative plan offered by the alternative-plan-searching unit 3004.

This embodiment uses an average input/output request count as typical information on average utilization and assumes that the size of input/output data is fixed. In this embodiment, substances of the present invention are all implemented in the management computer 2004 as shown in FIG. 3. It should be noted, however, that any processing blocks or some sub-blocks of a processing block can also be provided in the storage apparatus 3011 or any of the client computers 2002 and 2003 and the management computer 2004, which are shown in FIG. 2.

Figure 4:
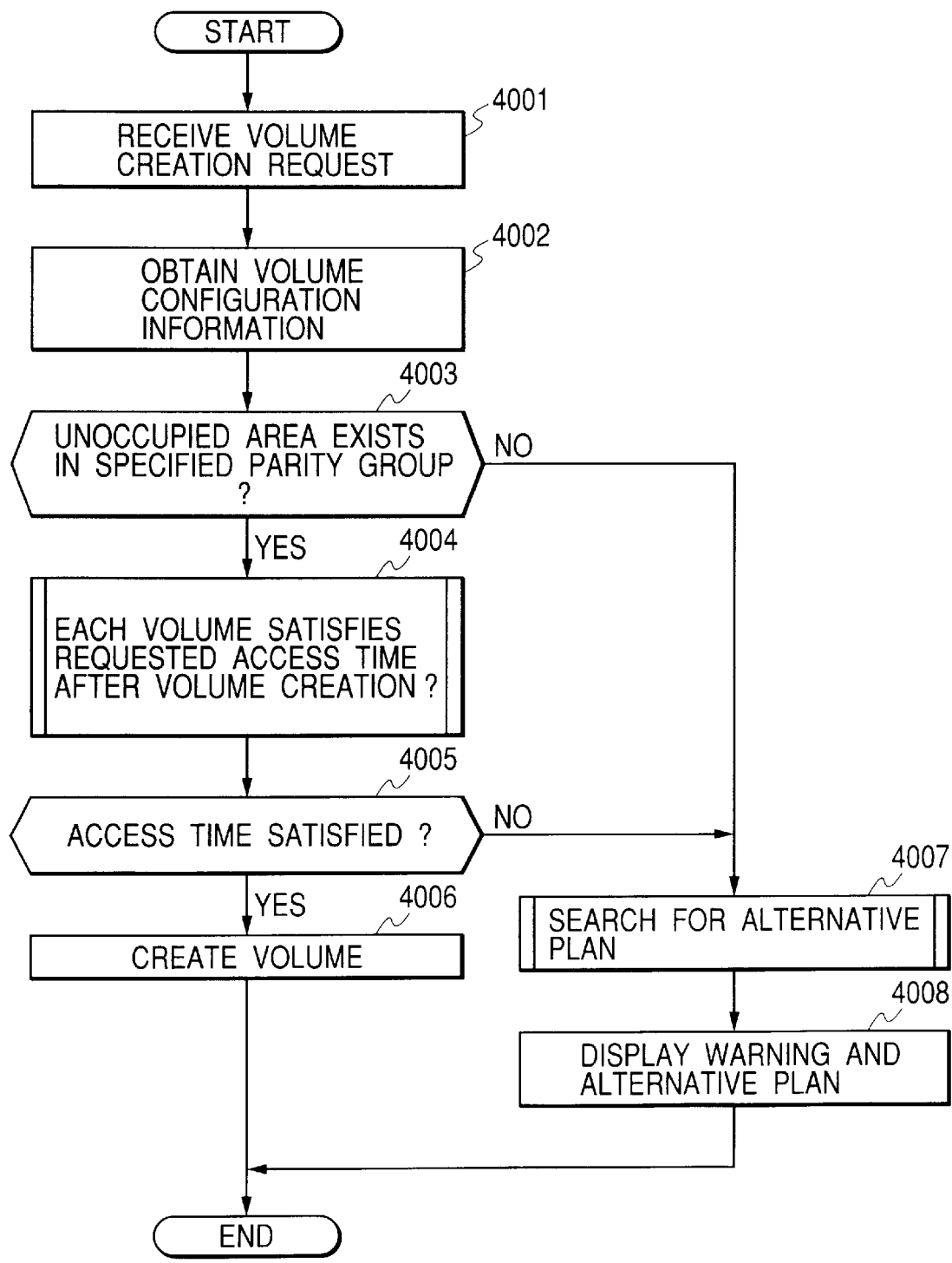
FIG. 4 shows a flowchart representing the procedure of processing to create a volume in accordance with the embodiment.

FIG. 4 shows a flowchart representing the procedure of processing of a request to create a volume in the management computer 2004 shown in FIG. 2 in accordance with the present invention. As shown in FIG. 4, the flowchart begins with a step 4001 to receive a request for creation of volume, the storage capacity of the volume to be created, an average I/O count of the volume, a requested access time of the volume and a parity group on which the volume is to be created. This processing is carried out by the volume-creation-request-receiving unit 3001 shown in FIG. 3. It should be noted that, if a requested access time and an average I/O count are not specified along with the volume creation request received at this step, default values determined in advance are used in the subsequent processing. An example of default values are 50 msec in the requested access time and 1,000 requests/sec in the average I/O count. At a step 4002 following the step 4001, the volume-configuration-information receiver 3008 shown in FIG. 3 acquires information on the configuration of all parity groups using all physical disks composing a parity group on which the volume is to be created. Then, the flow of the procedure goes on to a step 4003 to form a judgment as to whether or not the specified storage capacity of the volume to be created is available in the parity group on which the volume is to be created. If a sufficient storage capacity is not available in the parity group on which the volume is to be created, the flow of the procedure goes on to a step 4007 to search for an unoccupied area satisfying a specified storage capacity and a specified requested access time. Then, at the next step 4008, a warning and an alternative plan are displayed before the processing is ended. The formation of a judgment as to whether or not the specified storage capacity of the volume to be created is available is carried out at the step 4003 by the volume-creation-request-processing unit 3003 shown in FIG. 3. The search for an unoccupied area is conducted at the step 4007 by the alternative-plan-searching unit 3004 also shown in FIG. 3. At the next step 4008, a warning and an alternative plan are displayed by the warning & alternative-plan-displaying unit 3002 also shown in FIG. 3.

If the outcome of the judgment formed at the step 4003 indicates that the specified storage capacity of the volume to be created is available in the parity group on which the volume is to be created, on the other hand, the flow of the procedure goes on to a step 4004 to examine the access times of all volumes defined on physical disks composing the specified parity group after creation of the requested volume. Then, the flow of the procedure goes on to a step 4005 to form a judgment as to whether or not each of the examined access times satisfy its requested access time. The examination of the access times and the formation of the judgment are carried out by the requested-access-time preservation examiner 3005 shown in FIG. 3. If the outcome of the judgment indicates that the access times of all volumes defined on physical disks composing the specified parity group satisfy their access times, the flow of the procedure goes on to a step 4006 at which the request for creation of the volume is supplied to the storage apparatus and the volume is created. The judgment is formed at the step 4005 by the volume-creation-request-processing unit 3003 while the processing of the step 4006 is carried out by the volume-creation-request issuer 3007. If the outcome of the judgment formed at the step 4005 indicates the access times of one or more volumes do not satisfy the requested access times, on the other hand, the flow of the procedure goes on to the step 4007 to search for an alternative plan. Then, at the next step 4008, a warning and the alternative plan are displayed. As described above, the search for an unoccupied area is conducted at the step 4007 by the alternative-plan-searching unit 3004 and, at the next step 4008, a warning and the alternative plan are displayed by the warning & alternative-plan-displaying unit 3002.

Figure 5:
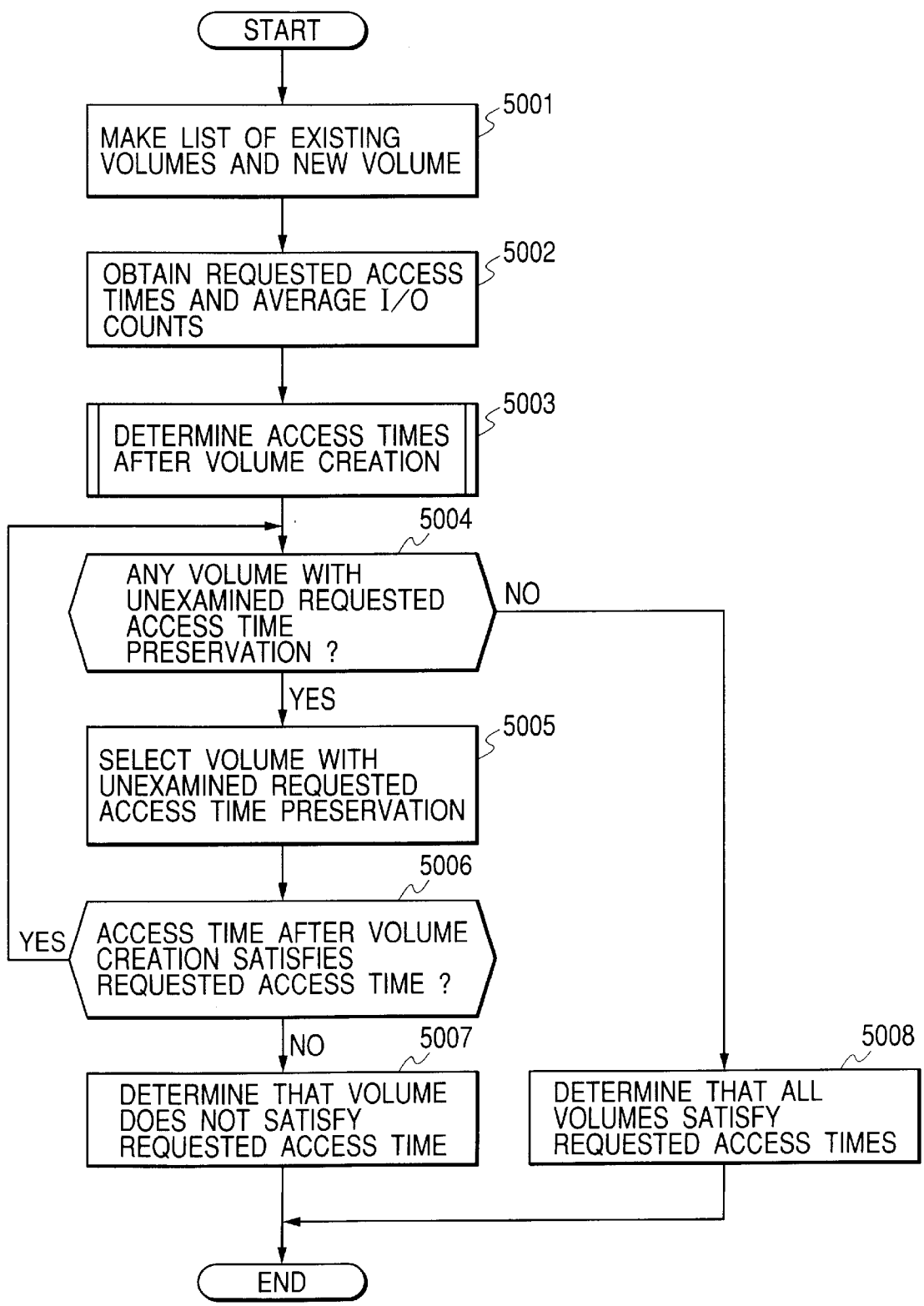
FIG. 5 shows a flowchart representing the procedure for examining whether or not all volumes each satisfy a required access time after processing to create a volume in accordance with the embodiment.

FIG. 5 shows a flowchart representing the procedure executed at the step 4004 of the flowchart shown in FIG. 4, that is, the procedure for examining whether or not all volumes each satisfy a required access time after creation of the requested volume. As shown in FIG. 5, the flowchart begins with a step 5001 to create a list of already existing volumes pertaining to a parity group and a volume newly created on the same parity group. If there is another parity group sharing physical disks with the parity group of the list, however, volumes of the other parity group are included in the list. Then, at the next step 5002, the requested access time and the average I/O count of each volume on the list are obtained. Subsequently, at the next step 5003, a post-requested-volume-creation access time to be assigned to each volume is determined. Then, at the next step 5004, the list is examined to form a judgment as to whether or not there is a volume with unverified preservation of the post-requested-volume-creation access time thereof on the list. If such a volume no longer exists on the list, the flow of the procedure goes on to a step 5008 to make a decision that all volumes on the list satisfy their requested access times before ending the procedure. If the outcome of the judgment formed at the step 5004 indicates that there is one or more volumes with unverified preservation of the requested access times thereof on the list, on the other hand, the flow of the procedure goes on to a step 5005 at which a next volume with unverified preservation of the requested access time thereof is selected from the list. Then, the flow of the procedure goes on to a step 5006 to form a judgment as to whether or not the selected volume's post-requested-volume-creation access time determined at the step 5003 satisfies the requested access time obtained at the step 5002. If the selected volume's post-requested-volume-creation access time satisfies its requested access time, the flow of the procedure goes back to the step 5004. If the selected volume's post-requested-volume-creation access time does not satisfy its requested access time, on the other hand, the flow of the procedure goes on to a step 5007 to make a decision that a volume on the list does not satisfy its requested access time before ending the procedure.

Information on already existing volumes is obtained at the step 5001 of the flowchart described above by the volume-configuration-information receiver 3008 shown in FIG. 3. In addition, requested access times are acquired at the step 5002 from the requested-access-time storage 3006. Furthermore, a post-requested-volume-creation access time to be assigned to each volume is determined at the step 5003 by the post-volume-creation-access-time calculator 3009 also shown in FIG. 3. Pieces of processing are carried out at the other steps by the requested-access-time preservation examiner 3005.

As described above, all already existing volumes on the list created at the step 5001 are examined to verify that the post-requested-volume-creation access time of each volume satisfies its requested access time. It should be noted, however, that the post-requested-volume-creation access time can be verified for each volume using the same physical disks as the specified parity group or each volume included in the specified parity group.

Figure 6:
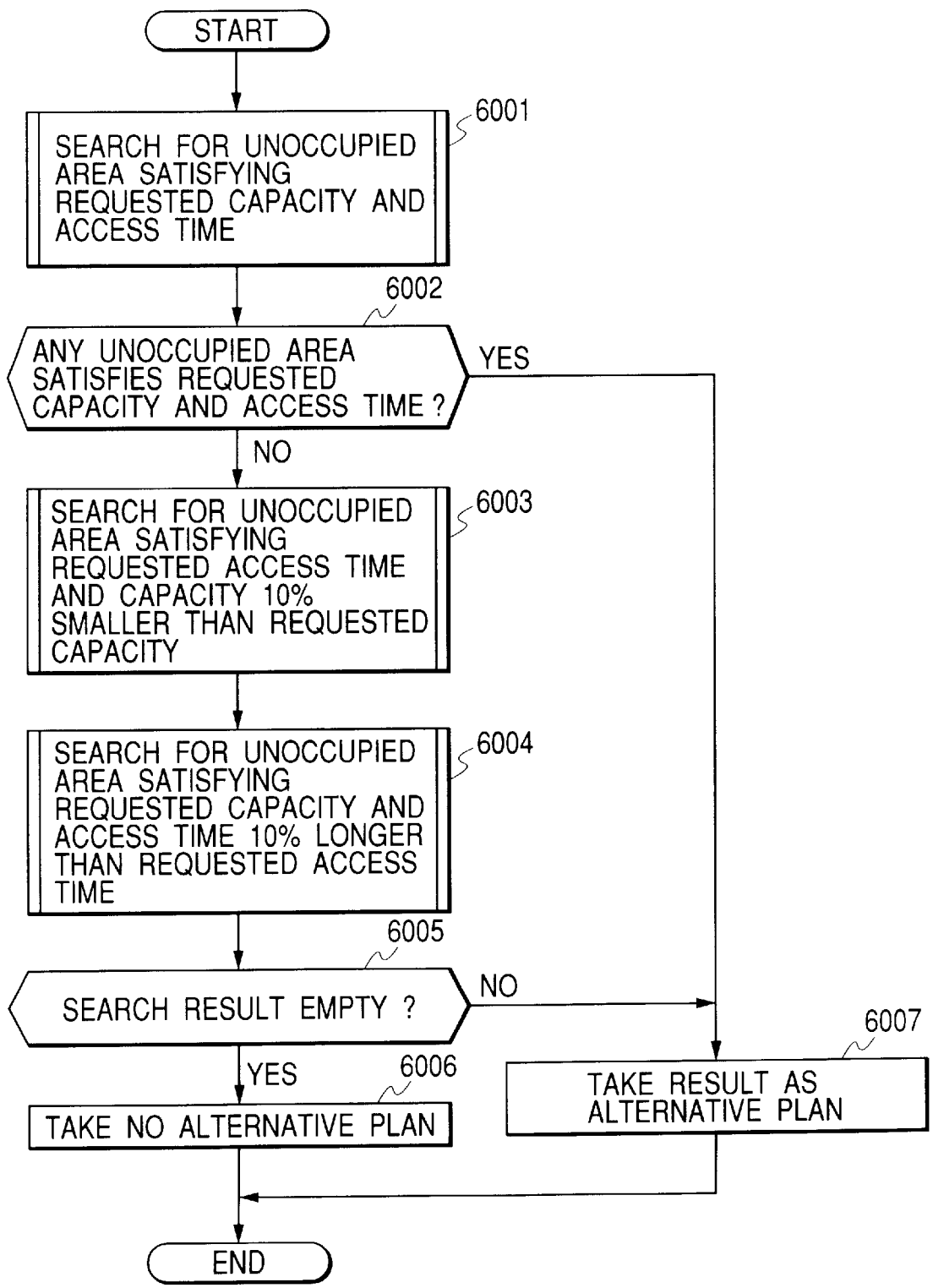
FIG. 6 shows a flowchart representing a procedure for searching for an alternative plan of the embodiment.

FIG. 6 shows a flowchart representing a procedure executed at the step 4007 of the flowchart shown in FIG. 4 to search for an alternative plan. As shown in the figure, the flowchart representing a procedure for searching for an alternative plan begins with a step 6001 at which all physical disks are searched for an unoccupied area satisfying a storage capacity and an access time, which are specified in the request for creation of a new volume. Information used in the search is the volume-configuration information acquired at the step 4002 of the flowchart shown in FIG. 4. The flow of the procedure then goes on to a step 6002 to form a judgment as to whether or not an unoccupied area satisfying the specified storage capacity and the specified access time is found in the search carried out at the step 6001. If such an area exists, the flow of the procedure goes on to a step 6007 at which the result of the search is used as the alternative plan before the procedure is ended. If the outcome of the judgment formed at the step 6002 indicates that an unoccupied area satisfying the specified storage capacity and the specified access time is not found in the search, on the other hand, the flow of the procedure goes on to a step 6003 at which all the physical disks are searched for an unoccupied area satisfying the access time and a new storage capacity obtained as a result of reduction of the specified storage capacity by 10%. Without regard to whether or not such an unoccupied area is found in the search, the flow of the procedure goes on to a step 6004 at which all the physical disks are searched for an unoccupied area satisfying the specified storage capacity and a new access time obtained as a result of increasing the specified access time by 10%. The new access time obtained as a result of increasing the specified access time by 10% means that a period of time required for making an access to such an area, if found in the searched, may be longer by 10%. Then, the flow of the procedure goes on to a step 6005 to form a judgment as to whether or not such an area has been found in the search conducted at the step 6003 or 6004. If such an area exists, the flow of the procedure goes on to the step 6007 at which the result of the search is used as the alternative plan before the procedure is ended. If the outcome of the judgment formed at the step 6005 indicates that such an area does not exist, on the other hand, the flow of the procedure goes on to a step 6006 to make a decision that no alternative plan exists before the procedure is ended. The processing of each step of the flowchart shown in FIG. 6 described above is carried out by the alternative-plan-searching unit 3004.

In accordance with the explanation of the flowchart shown in FIG. 6, a new storage capacity obtained as a result of reduction of the requested storage capacity by 10% is used at the step 6003 while a new access time obtained by increasing the requested access time by 10% is used at the step 6004. It should be noted, however, that the rate of 10% is an example. As an alternative method, a rate specified by the user of the present invention may be used. As another method, a rate providing a high probability of an alternative plan's being found may be used. Such a rate can be found from a past search history. In addition, as another alternative method, if no alternative plan is found, the rate used at the steps 6003 and 6004 is changed and used in the pieces of processing at the step 6003 and the subsequent steps. As a further alternative method, only the processing of either the step 6003 or the step 6004 is carried out. As a still further alternative method, the processing of either the step 6003 or the step 6004 is carried out repeatedly.

FIG. 7 shows a flowchart representing the procedure of processing carried out at the step 6001, 6003 or 6004 of the flowchart shown in FIG. 6 to search for an unoccupied area satisfying a specified storage capacity and a specified access time. As shown in FIG. 7, the flowchart begins with a step 7001 to acquire a list of unoccupied areas in all parity groups. Such a list is acquired by using the volume-configuration-information receiver 3008 shown in FIG. 3. Then, the flow of the procedure goes on to a step 7002 to form a judgment as to whether or not the list includes an unexamined available area satisfying the specified storage capacity and the specified access time. If the list does not include such an unexamined available area, the procedure is ended. If the outcome of the judgment formed at the step 7002 indicates that the list includes such an unexamined available area, on the other hand, the flow of the procedure goes on to a step 7003 at which an area is selected. Then, at the next step 7004, all volumes defined in the parity groups formed on the selected unoccupied area are examined to determine whether or not the volumes each satisfy the requested access time after creation of a new volume in case the new volume is created in the area. The processing of the step 7004 is carried out in accordance with the processing procedure represented by the flowchart shown in FIG. 5. Then, the flow of the procedure goes on to a step 7005 to form a judgment as to whether or not the volumes satisfy the required access times. If the volumes do not satisfy the required access times, the procedure is ended. If the outcome of the judgment formed at the step 7005 indicates that the volumes satisfy the required access times, on the other hand, the flow of the procedure goes on to a step 7006 at which the selected available area is added to results of the search. Then, the flow of the procedure goes back to the step 7002 at which the search processing is continued. It should be noted that the processing of the step 7004 of the flowchart shown in FIG. 7 is carried out by the requested-access-time preservation examiner 3005 shown in FIG. 3 whereas the processing of all the other steps is carried out by the alternative-plan-searching unit 3004.

FIG. 8 shows a flowchart representing a procedure executed at the step 5003 of the flowchart shown in FIG. 5 to determine access times after creation of a volume. As shown in FIG. 8, the flowchart begins with a step 8001 to calculate a sum of average I/O counts of cataloged volumes on the list. Then, at the next step 8002, the average I/O count of a volume to be created is added to the sum calculated at the step 8001. The result obtained at the step 8002 is thus a new sum of average I/O counts of volumes defined in the parity group after the requested volume is created. Then, at a step 8003 following the processing carried out at the step 8002, a table for determining access time after creation of a volume is referenced. Result of the reference to the table is used as an access time after creation of a volume. In place of the table for determining access time after creation of a volume, a formula may be used for computing access time after creation of a volume. In this case, an access time after creation of a volume which is found as a result of computation based on the formula is used.

In this embodiment, access time after creation of a volume is determined at the step 5003 by the post-volume-creation-access-time calculator 3009 employed in the management computer 2004 shown in FIG. 3. It should be noted, however, that a block for carrying out processing of this step may also be provided in the storage apparatus 3011. In this case, the storage apparatus 3011 needs to be provided with a parity-group-performance logging unit for collecting a performance log of a parity group, an access-time-determining unit for determining access times after creation of a volume and a request-receiving unit for receiving a request for determination of access times after creation of a volume. The access-time-determining unit for determining access times after creation of a volume extracts an average access time of the log data closest to an average I/O count among the performance log collected by the parity-group-performance logging unit. The average I/O count is specified in a request received by the request-receiving unit for receiving a request for determination of access times after creation of a volume. The extracted average access time is used as an access time after creation of a volume. In this case, the management computer 2004 needs to be provided with a request-transmitting unit in place of the post-volume-creation-access-time calculator 3009. The request-transmitting unit is used for transmitting a request for determination of access times after creation of a volume. The request-transmitting unit transmits a request for determination of access times after creation of a volume to the access-time-determining unit employed in the storage apparatus 3011 as a unit for determining access times after creation of a volume.

FIG. 9 shows a typical table for determining an access time after creation of a volume. The table is referenced at the step 8003 of the flowchart shown in FIG. 8 in determination of an access time after creation of a volume. The table shows a relation of the sum of average I/O counts shown on a column 9001 and the achievable average access time shown on a column 9002. Numbers on the column 9001 each represent the sum of average I/O counts of volumes defined in a parity group specified in a request for creation of a volume in the group. On the other hands, numbers on the column 9002 are each an access time that can be achieved by the parity group having a sum of average I/O counts or a formula on the column 9001. It should be noted that the table shown in FIG. 9 to be used for determining access times after creation of a volume can be provided as a table common to all parity groups in the storage apparatus or provided for each parity group.

The numbers shown in the table of FIG. 9 are the examples. In an actual case, different numbers can also be used. As an alternative, the values of the numbers shown in the table can be variable. That is to say, performance logs are collected in the client computer 2002 and/or the client computer 2003, which are shown in FIG. 2, and an average I/O count as well as an average access time of the parity group or another parity group comprising physical disks with the same configuration and the same performance are extracted and supplied to the management computer 2004 to be reflected in the table for determining access times after creation of a volume.

In addition, values of numbers shown in the access-time determining table can be computed from the number of physical disks composing the parity group, their performance, specification performance values described in a catalog, the RAID level of the parity group and the storage capacity of a usable cache memory. In order to find an average access time of a parity group, for example, an average or the largest of average access times of physical disks composing the parity group is multiplied by a fixed value determined by the RAID level of the parity group. Examples of the fixed value determined by the RAID level of a parity group are 2 for a RAID level of 1 and ½ for a RAID level of 5 at which the number of physical disks for storing data is 3 and the number of physical disks for storing redundant data is 1.

FIG. 10 shows a table of information held by a requested-access-time storage 3006 shown in FIG. 3. Each data on a column 10001 is the identifier of a volume. Each number on a column 10002 is an access time of a volume identified by the identifier on the same row of the column 10001 and each number on a column 10003 is an average I/O count of a volume identified by the identifier on the same row of the column 10001.

This embodiment implements typical centralized management of requested access times in the requested-access-time storage 3006 shown in FIG. 3. It should be noted that access times can also be collected and held in a client computer, a management computer or a storage apparatus. As an alternative, an access time can also be provided for each volume defined in the storage apparatus.

FIG. 11 shows a table of volume-configuration information held by the volume-configuration-information storage unit 3014 employed in the storage apparatus 3011 shown in FIG. 3. To be more specific, FIG. 11(*a*) shows a relation between the parity group, physical disks composing the parity group and the RAID level of the parity group. A column 11001 represents identifiers each identifying a parity group. A column 11002 represents physical-disk sets each composing a parity group on the same row. A column 11002 represents RAID level set for a parity group on the same row. On the other hand, FIG. 11(*b*) shows a relation between the parity group, the volumes assigned to the parity group or the unoccupied area existing in the parity group and the storage capacities of the volumes or the storage capacity of the unoccupied area. A column 11004 represents identifiers each identifying a parity group. A column 11005 represents volume sets each composing a parity group on the same row and unoccupied areas each existing in a parity group on the same row. A column 11006 represents storage capacities of the volumes on the same rows of the column 11005 or volumes of unoccupied areas on the same rows of the column 11005.

In this embodiment, if there is a volume not satisfying a requested access time after creation of a volume, a warning and an alternative plan are displayed. It should be noted, however, that only a warning can also be displayed without an alternative plan. In this case, the processing of the step 4007 of the flowchart shown in FIG. 4 is not carried out. Only a warning is displayed at the step 4008. In addition, after a warning is issued, it is possible to verify whether or not a requested volume still needs to be created. If the user prefers to continue the process to create a volume, the volume may be created even if the access time of other volumes will no longer satisfy the requested access times. In this case, the processing flow shown in FIG. 4 continues from the step 4008 to the step 4006 if the user prefers to continue the process to create a volume or the processing is ended after the step 4008 if the user prefers to end the process to create a volume.

The description of this embodiment is limited to creation of a volume. It should be noted, however, that the embodiment is also capable of moving a volume. In the creation of a volume, effects on performance are taken into consideration by focusing on a parity group in which the volume is to be created. In the case of a volume movement, on the other hand, effects on performance are taken into consideration by focusing on a parity group to which the volume is to be moved.

The table shown in FIG. 9 and used for determining access time after creation of a volume and information shown in FIG. 10 and held by the requested-access-time storage 3006 can be changed as specified by the person in charge of storage management or modified automatically at a specified time. For example, a timer is used for setting times at which table entries are periodically changed or the term of validity is set for the table entries. In addition, a priority level may be assigned to a requested access time with regard to information held by the requested-access-time storage 3006 shown in FIG. 3. The priority level is used as a basis at the step 4008 of the flowchart shown in FIG. 4 to form a judgment as to whether to end the procedure after display of warning or to verify continuation of the creation of a volume as described above.

As a second embodiment, the following description explains a procedure for specifying a requested access time and displaying an area satisfying the requested access time. FIG. 12 shows a flowchart representing the procedure for specifying a requested access time and for acquiring a list of unoccupied areas satisfying the requested access time. As shown in the figure, the flowchart begins with a step 12001 at which a requested access time is acquired. Then, at the next step 12002, unoccupied areas satisfying conditions are searched for. The conditions are, for example, that each of the unoccupied areas shall satisfy the requested access time and have a storage capacity of at least 500 megabytes. As a search method, the procedure represented by the flowchart shown in FIG. 6 is used. The 500 megabytes specified as a condition is an exemplified number. Subsequently, at a step 12003 following the step 12002, a storage capacity and an access time after creation of a volume are displayed for each unoccupied area found in the search. In accordance with this embodiment, before a new volume is created, it is possible to form a judgment as to whether or not an unoccupied area satisfying the requested access time exists on physical disks.

This embodiment implements a procedure for specifying a requested access time and displaying a list of unoccupied areas each satisfying the requested access time. By the same token, the embodiment may also implement a procedure for specifying a requested storage capacity and displaying a list of unoccupied areas each having the requested storage capacity. As an alternative, storage capacities and access times after creation of a volume are displayed for all unoccupied areas without specifying a storage capacity and an access time.

A third embodiment implements a procedure for cataloging access times of volumes used in the first embodiment. FIG. 13 shows a flowchart representing a procedure for cataloging a requested access time of an already existing volume. As shown in the figure, the flowchart begins with a step 13001 to acquire information on each volume, the requested access time of which is to be cataloged. Then, at the next step 13002, access times after creation of a volume are determined by using the procedure represented by the flowchart shown in FIG. 8. Subsequently, the flow of the procedure goes on to a step 13003 to let the user select an access time as a requested access time under the condition of a value greater than access time after creation of a volume. Then, at the next step 13004, the selected access time is cataloged.

In the first, second and third embodiments, an access time is used as a typical performance evaluation standard. If the data transfer speed varies from volume to volume, the data transfer speed can also be used as a performance evaluation standard. As an alternative, a combination of the access time and the data transfer speed can also be used as a performance evaluation standard. In addition, data-reading performance and data-writing performance can be treated separately as different kinds of performance. Furthermore, evaluation standards are not limited to the performance. For example, the RAID level and information on reliability such as limitations on functions of the storage apparatus can also be used as evaluation standards. Moreover, a relative positional relation with other volumes can also be used as an evaluation standard. An example of such a relation is a relation between two volumes not using the same physical disk. In addition, a combination of two or more evaluation standards may also be specified. In this case, a warning may be issued to indicate that not all the specified evaluation standards are or even only one of them is satisfied.

In accordance with the third embodiment, requested access time is cataloged right after creation of a volume. It should be noted, however, that requested access time can also be cataloged after some time has lapsed since creation of a volume. As an alternative, requested access times can also be cataloged after the access time is determined but prior to creation of a volume. As another alternative, requested access time can also be cataloged before and after the volume-creating step 4006 of the flowchart shown in FIG. 4.

In the first, second and third embodiments, an average I/O count is used as information on average utilization of each volume. However, a client computer using the volume does not necessarily use the volume in a condition around the cataloged average I/O count. In some cases, a client computer using the volume uses the volume in an I/O count greater than the cataloged average I/O count, that is, several times the cataloged average I/O count. Thus, the performance of other volumes deteriorate. As a result, it is quite within the bounds of possibility that the other volumes no longer satisfy the requested performance. There are several methods that can each be used as a technique for preventing the average I/O count per unit time of a client computer from substantially increasing. One of the methods is a technique for limiting the number of I/O requests made by the client computer. To put it concretely, starting from a point of time at which the average number of currently issued I/O requests exceeds the average I/O count specified in creation of a volume, issuance of an I/O request is delayed by the client computer itself or no request is made during a predetermined period of time. As another method, if the present average I/O request processing count exceeds the average I/O count specified for each volume in the storage apparatus, the priority to process an I/O request issued to the volume is lowered for the time being, or it is possible not to process the request during a predetermined period of time.

In accordance with the present invention, in an operation to create or move a volume, the volume is created and moved by taking the requested performance of other volumes into consideration.

What is claimed is:

1. A volume management method for setting at least a logical volume over a plurality of physical storage devices, said method comprising the steps of:

receiving a volume creation request specifying a requested storage capacity and requested average performance;

forming a judgment as to whether or not there exists an unoccupied area satisfying said requested storage capacity throughout said storage devices;

forming a judgment as to whether or not all logical volumes, which include present logical volumes that are already set and each sharing any of said storage devices with a logical volume to be created and said logical volume to be created, each satisfy its requested average performance by referring to information of requested average performance on a storage means for each of said present logical volumes if said unoccupied area satisfying a requested storage capacity is determined to exist; and setting said logical volume to be created if said all logical volumes each satisfy said requested average performance.

2. A volume management method according to claim 1 wherein:

said all logical volumes pertain to the same parity group; and a request for creating a logical volume is a request to move said logical volume from another parity group.

3. A volume management method according to claim 1 wherein, if existing unoccupied areas do not satisfy at least one of said requested storage capacity and said requested average performance, an unoccupied area is again searched for by softening a condition for satisfying said requested storage capacity by reduction of said requested storage capacity by a predetermined fraction if said requested storage capacity is not satisfied, or by softening a condition for satisfying said requested average performance by reduction of said requested average performance by a predetermined fraction if said requested average performance is not satisfied.

4. A volume management method for searching for an unoccupied area used by a new logical volume over a plurality of physical storage devices, on which at least one logical volume is set, said method comprising:

receiving an unoccupied-area-searching request specifying information on requested average performance;

forming a judgment as to whether or not all logical volumes, which include present logical volumes that are already set and said new logical volume supposed to be added to said present logical volumes, each satisfy its requested average performance by referring to information of requested average performance on a storage means for each of said present logical volumes which share any of said storage devices with an unoccupied area; and displaying information on said area if said all logical volumes each satisfy said requested average performance.

5. A volume management apparatus for setting at least a logical volume over a plurality of physical storage devices, said apparatus comprising:

a means for receiving a volume creation request specifying a requested storage capacity and requested average performance;

a means for forming a judgment as to whether or not there exists an unoccupied area satisfying said requested storage capacity throughout said storage devices;

a means for forming a judgment as to whether or not all logical volumes, which include present logical volumes that are already set and each sharing any of said storage devices with a logical volume to be created and said logical volume to be created, each satisfy its requested average performance by referring to information of requested average performance on a storage means for each of said present logical volumes if said unoccupied area satisfying a requested storage capacity is determined to exist; and a means for setting said logical volume to be created if said all logical volumes each satisfy said requested average performance.

6. A volume management apparatus for searching for an unoccupied area used by a new logical volume over a plurality of physical storage devices, on which at least one logical volume is set, said apparatus comprising:

a means for receiving an unoccupied-area-searching request specifying information on requested average performance;

a means for forming a judgment as to whether or not all logical volumes, which include present logical volumes that are already set and said new volume supposed to be added to said present logical volumes, each satisfy its requested average performance by referring to information of requested average performance on a storage means for each of said present logical volumes which share any of said storage devices with an unoccupied area; and a means for displaying information on said area if said all logical volumes each satisfy said requested average performance.

7. A program to be executed by a computer to implement a function of setting at least a logical volume over a plurality of physical storage devices, wherein said program has functions of:

receiving a volume creation request specifying a requested storage capacity and requested average performance;

forming a judgment as to whether or not there exists an unoccupied area satisfying said requested storage capacity throughout said storage devices;

forming a judgment as to whether or not all logical volumes, which include present logical volumes that are already set and each sharing any of said storage devices with a logical volume to be created and said logical volume to be created, each satisfy its requested average performance by referring to information of requested average performance on a storage means for each of said present logical volumes if said unoccupied area satisfying a requested storage capacity is determined to exist; and setting said logical volume to be created if said all logical volumes each satisfy said requested average performance.

8. A program to be executed by a computer to implement a function for searching for an unoccupied area used by a new logical volume over a plurality of physical storage devices, on which at least one logical volume is set wherein said program has functions of:

receiving an unoccupied-area-searching request specifying information on requested average performance;

forming a judgment as to whether or not all logical volumes, which include present logical volumes that are already set and said new volume supposed to be added to said present logical volumes, each satisfy its requested average performance by referring to information of requested average performance on a storage means for each of said present logical volumes which share any of said storage devices with an unoccupied area; and displaying information on said area if said all logical volumes each satisfy said requested average performance.

9. A volume management method adopted by a management computer included in a computer system comprising a storage apparatus having a plurality of physical storage devices over which at least a logical volume is set, a client computer for making accesses to information stored in said storage apparatus, said management computer for managing logical volumes in said storage apparatus and a network for connecting said storage apparatus, said client computer and said management computer to each other, said method comprising the steps of:

receiving a volume creation request specifying a requested storage capacity and requested average performance;

forming a judgment as to whether or not there exists an unoccupied area satisfying said requested storage capacity throughout said storage devices;

forming a judgment as to whether or not all logical volumes, which include present logical volumes that are already set and each sharing any of said storage devices with a logical volume to be created and said logical volume to be created, each satisfy its requested average performance by referring to information of requested average performance on a storage means for each of said present logical volumes if said unoccupied area satisfying a requested storage capacity is determined to exist; and setting said logical volume to be created if said all logical volumes each satisfy said requested average performance.

10. A volume management method for searching a storage apparatus for an unoccupied area used by a new logical volume, adopted by a management computer included in a computer system comprising said storage apparatus having a plurality of physical storage devices over which at least a logical volume is set, a client computer for making accesses to information stored in said storage apparatus, said management computer for managing logical volumes in said storage apparatus and a network for connecting said storage apparatus, said client computer and said management computer to each other, said method comprising the steps of:

receiving an unoccupied-area-searching request specifying information on requested average performance;

forming a judgment as to whether or not all logical volumes, which include present logical volumes that are already set and said new volume supposed to be added to said present logical volumes, each satisfy its requested average performance by referring to information of requested average performance on a storage means for each of said present logical volumes which share any of said storage devices with an unoccupied area; and displaying information on said area if said all logical volumes each satisfy said requested average performance.

* * * * *